United States Patent Office 2,960,444
Patented Nov. 15, 1960

2,960,444

PROCESS FOR THE TREATMENT OF CELLULOSIC MATERIALS

Ernest Augustus Ritter, Umhlanga Rocks, Natal, Union of South Africa, assignor to Malise Graham Mackeurtan, Durban, Natal, Union of South Africa No Drawing. Filed July 11, 1956, Ser. No. 597,073

Claims priority, application Union of South Africa July 28, 1955

15 Claims. (Cl. 195—8)

This invention relates to the treatment of cellulosic fibrous materials either for the purpose of preserving them or for the dual purpose of preserving them and pre-digesting them in order to facilitate their subsequent conversion into cellulose or cellulose products such as paper.

With a view to overcoming the disadvantages inherent in the conventional chemical methods of pre-treating incrusted cellulosic fibrous materials, a fermentation pre-treatment process has previously been proposed. In essence, the aforesaid process comprised the steps of impregnating the incrusted cellulosic material with a liquor containing bacteria cultured upon or derived from the material itself; controlling the amount of nutrient in the fermentation mass to such a value as would result in a controlled fermentation to yield a good quality cellulose; allowing the impregnated mass to ferment in the presence of a limited quantity of air; and then washing the material and compressing it into bales which were air-dried in an open stack.

The required bacteria were produced by sterilizing water, adding the fibrous material to it together with a nutrient, and maintaining the temperature at about blood heat. The temperature of the liquor was then gradually reduced over a period of about fourteen days to a temperature of from 10° to 15° F. below the lowest likely ambient temperature and, each day during the cultivation of the bacteria, the temperature of the liquor was raised and lowered roughly to the extent of the difference between the daily maximum and minimum atmospheric temperatures.

It has now been found that by proceeding in accordance with the above-mentioned process of the prior art, a plurality of bacteria were produced some of which were beneficial whilst others were not. In particular, the butyric acid and acetic acid bacteria fell in the latter category. As stated above, essential steps of the previous process involved washing the material and compressing it into bales. The reason for these steps was in order to remove the bacteria after fermentation, since it transpired that if the bacteria were allowed to remain, deterioration of the material resulted.

A further disadvantageous factor inherent in the process of the prior art was its inability to produce a homogeneous stack. The stacks were found to contain unpreserved or mouldy parts which either had to be removed in laborious fashion or the final product produced from the material was of uneven quality.

The object of the present invention is two-fold. Firstly, it aims at eliminating the disadvantages of the prior art process outlined above and providing an improved and considerably simplified process for preserving the materials and simultaneously predigesting them to soften and loosen the incrustants. Secondly, in the rarer cases where predigestion is not required, the invention provides a process for the preservation of the raw materials.

In accordance with the invention, a process for the treatment of cellulosic materials comprises the steps of impregnating the cellulosic material with water containing, firstly, Lactobacilli cultured upon or derived from the material itself under conditions which result in the substantial overwhelming of other micro-organisms; secondly, an independently prepared culture of other Lactobacilli which are selectively active within the temperature range extending from the lower limit to be experienced in the material during storage thereof up to the lower limit at which the first-mentioned Lactobacilli are active; and, thirdly, a nutrient if necessary; and stacking the impregnated mass in a manner which will allow any surplus liquid to drain therefrom.

If it is desired merely to preserve the stacked mass, digestion may be substantially prevented by immediately compacting it to exclude an intake of air and so prevent the temperature of the mass from rising to levels at which digestion will take place. Any subsequent tendency for temperatures to rise to unwanted heights may be dealt with by the application of water. If, on the other hand, pre-digestion as well as preservation is the objective, the stacked mass is allowed to ferment in the presence of a limited quantity of air. To this end, the amount of air present in the mass, and hence the mean temperature of the mass, is kept within desired limits by periodic compaction and/or the application of water. When digestion has proceeded to a sufficient extent, it is arrested by compaction of the mass and/or by the application of water.

In the case of raw materials such as bagasse, cereal straws, long-stemmed grasses, banana stems, papyrus, cannas and pulp woods, such as black wattle and related acacias, and like vegetable matter, to all of which the process of the invention is applicable, the Lactobacilli cultured on or derived from the material itself will include thermoduric Lactobacilli such as *Lactobacillus caucasicus*, *Lactobacillus lactis*, *Lactobacillus helveticus*, *Lactobacillus acidophilus* and *Lactobacillus bifidus*. Thermophyllic Lactobacilli, such as *Lactobacillus bulgaricus*, *Lactobacillus thermophilus*, and *Lactobacillus delbrueckii*, will normally develop during fermentation of the stack.

Other Lactobacilli grown in the independent culture may include *Lactobacillus fermenti*, *Lactobacillus casei*, *Lactobacillus plantarum*, *Lactobacillus leichmannii*, *Lactobacillus brevis*, *Lactobacillus buchneri*, and *Lactobacillus pastorianus*.

Various examples will now be given of the manner in which the process of the invention is carried out.

*1. Treatment of bagasse*

A sterilized canvas bag is filled with absolutely fresh crushed bagasse which is tightly compacted. The mouth of the bag is sewn up and it is covered with canvas sheets. Within about twenty four hours, the bagasse will have reached a temperature of from 105° F. to 115° F. due to the action of Lactobacilli and the heat generated results in the substantial overwhelming of unwanted organisms such as those producing butyric and acetic acids.

The hot contents of the bag are now emptied into a 45 gallon drum containing sterilized water at a temperature of about 95° F. and one gallon of molasses is added as a nutrient. Within a few hours the contents of the drum will be an active coulture of Lactobacilli and the drum is then emptied into a 12,000 gallon main tank containing sterilized water at a temperature of from 70° F. to 95° F. and 0.2% of molasses or other nutrient.

The independent culture of the other Lactobacilli is made by keeping a pint of fresh milk in a vessel stoppered with cotton wool to act as an air filter for about one week. The contents of the vessel are then transferred to a 45 gallon drum filled with sterilized water and one gallon of molasses. After the culture has developed, this drum is emptied into the 12,000 gallon main tank mentioned in the preceding paragraph.

The bagasse to be treated should be as fresh as possible and it should preferably come straight from the sugar mill crushers. It may be carried to a stacking floor, for example of concrete, by means of launders through the medium of the bacterial liquid itself from the main tank. Alternatively, it may be carried by conveyors and sprayed with liquid from the main tank whilst in transit, or it may be spread in layers on the stacking floor and impregnated layer by layer by spraying with liquid from the main tank. Bagasse normally contains about 50% of water and, for optimum results, it should be impregnated until the proportion of liquids to solids is from 75% to 80% liquid to 25% to 20% of dry materials.

Excess bacterial liquid is allowed to drain from the stack and, if mere preservation is required, it is immediately compacted to reduce the quantity of air present and so keep the stack within a temperature range in which fermentation is curbed and digestion consequently inhibited. Subsequent compaction and/or the application of water may be resorted to if the temperatures tend to rise unduly.

If, on the other hand, it is desired to predigest the bagasse as well as to preserve it, it is important that the stack should not be compacted artifically in the initial stages. The temperatures in the stack should normally range from about 80° F. to 120° F., the mean temperature being about 112° F. and the colder regions being found at the top and bottom and in the outer wall layer. If the maximum temperature tends to exceed 120° F., it should be brought down by compacting the mass and/or by spraying it with water.

Within four to eight weeks from the commencement of the fermentation, the bagasse is ready to be removed from the stack for conversion into paper pulp in known manner. Should it be desired to store the bagasse in the stack, the digestion process should be arrested after the aforesaid four to eight weeks by compaction and/or the application of water to reduce the maximum temperature in the stack to not more than about 110° F. Under these conditions, the Lactobacilli which, in the presence of a limited supply of air, have acted both as preserving agents and as digesting agents, now fulfil only their former function. If the stack is watched and remedial measures applied if the maximum temperature tends to exceed 110° F., it may be stored in the open almost indefinitely.

The incrustants, being chiefly pecto-pentosans and lignins, having been softened and loosened from the fibres during the digestion, are easily separated from the fibres in the pulp mill. By removal of the refractory pecto-pentosans, the cellulose content of the fibre is raised whilst the bulk of the bagasse is reduced correspondingly, with the result that a bigger yield of pulp is obtained in the chemical digesters. Furthermore, the fibre concentrates, having been pre-digested, have been softened and rendered less resistant to chemicals. Consequently, they need less chemicals and a less drastic cooking so that the pulp is cheaper to produce and is of a better quality and more easily bleachable. The paper produced is stronger and has much higher folding attributes. Comparative tests made with a paper produced from bagasse which had not been pretreated and bagasse pretreated in accordance with this invention showed that the former was so brittle that it broke after about four double folds, whereas the latter could be doubel folded over 4000 times.

In the manufacture of paper pulp, bagasse fibre concentrates as above yield readily to the standard soda processes by one direct cooking, fractional or multiple cookings being unnecessary. The standard chlorination process can also be used advantageously without the necessity of a preliminary soda cooking to remove the incrustants. Finally, the concentrates are sufficiently predigested to allow the use of a mild mono-sulphite treatment which is very economical.

Cereal straws, long-stemmed grasses, papyrus, cannas, banana stems and like vegetable matter are chaffed or hammermilled and treated in exactly the same way as bagasse and the methods of producing the Lactobacilli cultures are the same. In this case, however, the raw material must, during impregnation, be allowed to absorb as much liquid as possible since, if it has been dried as it usually has been, it will never reach a stag where the proportion of liquids to dry material is greater than about 3:1.

2. Treatment of pulp woods

With pulp woods generally, the culture of the Lactobacilli grown on the material itself is prepared in the same manner as with bagasse but it is grown on sawdust obtained from fresh green wood. With wattle wood, it is grown on fresh bark which has been chaffed and crushed. Alternatively, it may be grown on fresh "spent tan" (i.e. the chaffed and crushed wattle bark after the tannin has been extracted from it) which should be taken hot from the boilers whilst it is sterilized and before it becomes unduly contaminated by unwanted airborne bacteria. Since wood does not contain as much in the way of pecto-pentosans as bagasse and the other vegetable materials mentioned, a nutrient should be added to the contents of the bag (e.g. from 4 to 5% molasses). It will generally also be necessary to increase the amount of nutrient added to the drum and the main tank respectively up to about 4%.

The material to be treated is chipped in the customary manner and, after stacking, it should be covered with a 6" layer of sawdust which must be kept damp. If mere preservation is required, the maximum temperature is kept down to below about 120° F. by the application of water.

If predigestion as well as preservation is the objective, the mean temperature of the stack should be allowed to rise to about 140° F., the maximum temperature being of the order of 160° F. The fermentation period is usually about two to three months after which the maximum temperature is kept below about 120° F. by the application of water.

During impregnation, the wood chips should be allowed to absorb as much moisture as possible (40 to 50%), but the relatively low water content does not lead to overheating since, as stated above, wood does not contain as much in the way of pecto-pentosans as the other raw materials mentioned.

I claim:

1. A process for the treatment of cellulosic material comprising the steps of impregnating the cellulosic material with water containing, firstly, a substantially pure culture of Lactobacilli cultured upon or derived from the material itself by stacking the material in a sterilized porous bag and allowing the temperature to rise above about 105° F. while the organisms grow and thereafter emptying the contents of the bag into sterilized water at about 95° F. and allowing the Lactobacilli to grow in the presence of a nutrient and, secondly, an independently prepared culture of other Lactobacilli which are selectively active within the temperature range extending from the lower limit to be experienced in the material during storage thereof up to the lower limit at which the first-mentioned Lactobacilli are active, and stacking the impregnated mass in a manner which will allow any surplus liquid to drain therefrom.

2. A process as defined in claim 1, wherein the process comprises the further step of allowing the stacked impregnated mass to ferment in the presence of a limited quantity of air.

3. The process of claim 1, in which the cellulosic material is bagasse and in which the temperature within the stacked mass is allowed to rise above room temperature to at most 110° F.

4. The process of claim 1 in which the cellulosic material is bagasse and in which the proportion of liquids to solids in the impregnated mass is from 3:1 to 4:1.

5. The process of claim 1, in which the cellulosic material is selected from the group consisting of cereal straws, long-stemmed grasses, papyrus, cannas, bagasse, pulp wood and banana stems and in which the material is allowed to absorb as much impregnating liquid as possible.

6. The process of claim 1, in which the first-mentioned Lactobacilli are cultured by tightly packing fresh cellulosic material into said sterilized porous bag and allowing the organisms to grow.

7. The process of claim 1, in which said other Lactobacilli are cultured from milk.

8. The process of claim 1, in which said other Lactobacilli are cultured from a milk product.

9. The process of claim 8, in which the cellulosic material is selected from the group consisting of cereal straws, long-stemmed grasses, papyrus, cannas, bagasse, pulp wood and banana stems and in which the material is allowed to absorb as much impregnating liquid as possible.

10. The process of claim 1, in which the cellulosic material is bagasse and in which the proportion of liquids to solids in the impregnated mass is from 3:1 to 4:1.

11. The process of claim 1, in which the cellulosic material is pulp wood and in which the material is allowed to absorb as much impregnating liquid as possible.

12. The process of claim 1, in which the cellulosic material is bagasse and in which the temperature within the stack is allowed to rise above room temperature to at most 120° F.

13. The process of claim 1, in which the cellulosic material is bagasse and in which the mean temperature of the stack is kept at 112° F.

14. The process of claim 1, in which the cellulosic material is pulp wood, and in which the temperature within the stack is allowed to rise above room temperature to at most 160° F.

15. The process of claim 1, in which the cellulosic material is pulp wood and in which the mean temperature of the stack is kept at 140° F.

References Cited in the file of this patent

UNITED STATES PATENTS

| | | |
|---|---|---|
| 1,448,391 | Cromer | Mar. 13, 1923 |
| 1,497,808 | Summers | June 17, 1924 |
| 1,572,539 | Lathrop et al. | Feb. 9, 1926 |
| 1,574,254 | Munroe | Feb. 23, 1926 |
| 1,739,645 | Munroe et al. | Dec. 17, 1929 |
| 1,920,129 | Munroe et al. | July 25, 1933 |

FOREIGN PATENTS

| | | |
|---|---|---|
| 497,960 | Great Britain | Dec. 30, 1938 |

OTHER REFERENCES

Ser. No. 413,551, Roxas (A.P.C.), published May 18, 1943.